United States Patent [19]

Ruegg et al.

[11] Patent Number: 4,837,382
[45] Date of Patent: Jun. 6, 1989

[54] PROCESS AND APPARATUS FOR UNIFORMLY FORMING INDIVIDUAL FOOD PIECES FROM A MASS OF FLOWABLE MATERIAL

[75] Inventors: Richard J. Ruegg, Coppell; William R. Slovak, Arlington; Moise Riboh, Plano, all of Tex.

[73] Assignee: Frito-Lay, Inc., Dallas, Tex.

[21] Appl. No.: 119,036

[22] Filed: Nov. 10, 1987

[51] Int. Cl.⁴ .......................... A21C 3/10; A21D 6/00
[52] U.S. Cl. ..................................... 426/503; 425/294; 425/307; 425/308; 425/397; 426/518
[58] Field of Search ............... 426/503, 516, 518, 448; 425/294, 296, 299, 306, 307, 308, 313, 316, 292, 294, 397, 363, 335, 444, 446; 83/346, 347, 422

[56] References Cited

U.S. PATENT DOCUMENTS

| | | | |
|---|---|---|---|
| 1,330,434 | 2/1920 | Ekberg | 425/315 |
| 2,043,554 | 6/1936 | Potdevin | 83/401 |
| 2,365,838 | 12/1944 | Perkins | 83/401 |
| 3,123,656 | 3/1964 | Rochlin | 264/321 |
| 3,364,877 | 1/1968 | Zublena | 425/294 |
| 3,646,894 | 3/1972 | Hasten et al. | 426/503 |
| 3,869,831 | 3/1975 | Gibb | 51/75 |
| 4,008,639 | 2/1977 | Hasegawa | 83/371 |
| 4,045,151 | 8/1977 | Zazzara | 425/307 |
| 4,072,551 | 2/1978 | Dabal et al. | 156/378 |
| 4,120,627 | 10/1978 | Abe | 425/92 |
| 4,340,342 | 7/1982 | Kim | 425/72 R |

Primary Examiner—George Yeung
Attorney, Agent, or Firm—Bernard, Rothwell & Brown

[57] ABSTRACT

A mass of flowable food material is extruded to form a moving, continuous, flexible extrudate ribbon that is cured to form a continuous, semi-rigid ribbon. During curing, the ribbon is fed between a pair of pull rollers that pull the ribbon at a rate of speed that is faster than the extrusion rate of the ribbon, to thereby stretch the ribbon while being cured into semi-rigidity. The semi-rigid ribbon then is fed between a cutter roller and an opposing backup roller, the cutter roller including outwardly projecting, transversely mounted blades with edges that bias against an outer support surface of the backup roller during cutting. The opposing cutter and backup rollers rotate at substantially the same speed as the pull rollers to cut the semi-rigid ribbon with cuts that are substantially perpendicular to the direction of ribbon travel, thereby forming individual food pieces having substantially planar cut faces.

27 Claims, 2 Drawing Sheets

PROCESS AND APPARATUS FOR UNIFORMLY FORMING INDIVIDUAL FOOD PIECES FROM A MASS OF FLOWABLE MATERIAL

BACKGROUND OF THE INVENTION

1. Field of the Invention

The present invention relates to the field of forming individual food pieces from extruded food material.

2. Description of the Background Art

Food products produced by processes involving extrusion are well known. In the production of puffed snack products, a farinaceous material typically is extruded through a die orifice, fly-cut into snack-size pieces while still soft, then baked or fried into the final product. Fly-cutting of soft extrudate shortly after extrusion generally does not provide a clean, planar cut of the material, but instead, usually results in a non-uniform "pinch" cut of the material. On the other hand, if the extrudate is allowed to completely rigidify prior to cutting, the material shatters upon cutting to produce a fractured product rather than a product with a smooth, straight cut.

A variety of devices are known in the art for cutting materials that can have quite different characteristics. For example, U.S. Pat. No. 4,120,627 discloses an apparatus for continuously extruding a rod of marshmallow material that is fed to a pair of opposed cutter drums by a continuous belt conveyor and a plurality of guide rollers.

U.S. Pat. No. 3,364,877 discloses a device wherein a cutting roller acts against a smooth surface of an endless belt feeder and roller, or against a roller alone with an independent belt feeder, to uniformily feed product to be cut.

U.S. Pat. No. 2,365,838 discloses a candy stick machine wherein material to be formed into candy sticks is fed to a cutter between a pair of rollers, the material then being thereafter cut by knives mounted on a roller.

U.S. Pat. No. 4,072,551 discloses an apparatus wherein a continuous strip of material is passed between a pair of press rollers which then is fed to a second roller station for feeding continuous material to a third set of cutting rollers to finally divide the product.

Other patents showing various roller-type feeder and cutter devices are shown in the following U.S. Pat. Nos: 4,340,342; 4,008,639; 3,869,831; 3,123,656; 2,043,554 and 1,330,434.

There remains a need in the art for processes and devices for uniformly forming individual pieces of food material.

SUMMARY OF THE INVENTION

In accordance with the present invention, a process for forming individual food pieces from a mass of flowable material comprises continuously extruding a flowable food material through a die orifice at a first rate of speed, to form a moving, continuous, flexible extrudate ribbon. The continous flexible ribbon is cured to form a continuous semi-rigid ribbon that can be cut with substantially planar cuts and without substantial pinching of the ribbon during cutting. During curing, the continuous ribbon is fed between a pair of pull rollers having opposing roller surfaces that contact the ribbon. The pull rollers are rotated in opposite directions so that the opposing roller surfaces pull the continuous ribbon at a rate of speed that is faster than the extrusion rate of the ribbon, to thereby stretch the ribbon during partial rigidification thereof. The semi-rigid ribbon is then pushed by the pull rollers into a cutter, a cutter roller, and an opposing backup roller. The cutter roller has outwardly projecting transversely mounted blades with edges that bias against an outer support surface of the backup roller during cutting. The blades of the cutter roller are positioned to form cuts in the ribbon that are substantially perpendicular to the ribbon. The opposing cutter and backup rollers are rotated in opposite directions so that the cutter blade edges and the outer support surface of the backup roller rotate at substantially the same speed as the opposing roller surfaces of the pull rollers to cut the semi-rigid ribbon with cuts that are substantially perpendicular to the ribbon, thereby forming individual food pieces having substantially planar cut faces. An apparatus for carrying out the process of the invention is also disclosed.

DETAILED DESCRIPTION OF THE PREFERED EMBODIMENTS

The present invention relates to a process for uniformly forming individual food pieces from a mass of flowable food material, and to an apparatus for practicing such process. The flowable food material may be any edible, formable material which may be used in an extrusion process, and which is capable of rigidification after extrusion. Preferred formable materials are made using farinaceous products such as meals, flours starch-based flakes and the like, or mixtures thereof. Meals, flours or starch-based flake materials which are suitable for use according to the present invention include those made from potatoes, corn (including white corn), rice, oats, wheat, legumes, and the like, or mixtures thereof.

Sufficient moisture is mixed with the meal, flour and/or flake material to form an extrudable mixture. The water is added to the mix prior to introduction into an extruder, after introduction into a extruder or both. Other ingredients may optionally be added to the mixture to alter the flavor, texture and/or appearance of the product. Leavening agents, such as monocalcium phosphate and/or sodium bicarbonate, are preferred optional ingredients for altering the texture of the product.

Figure 1:
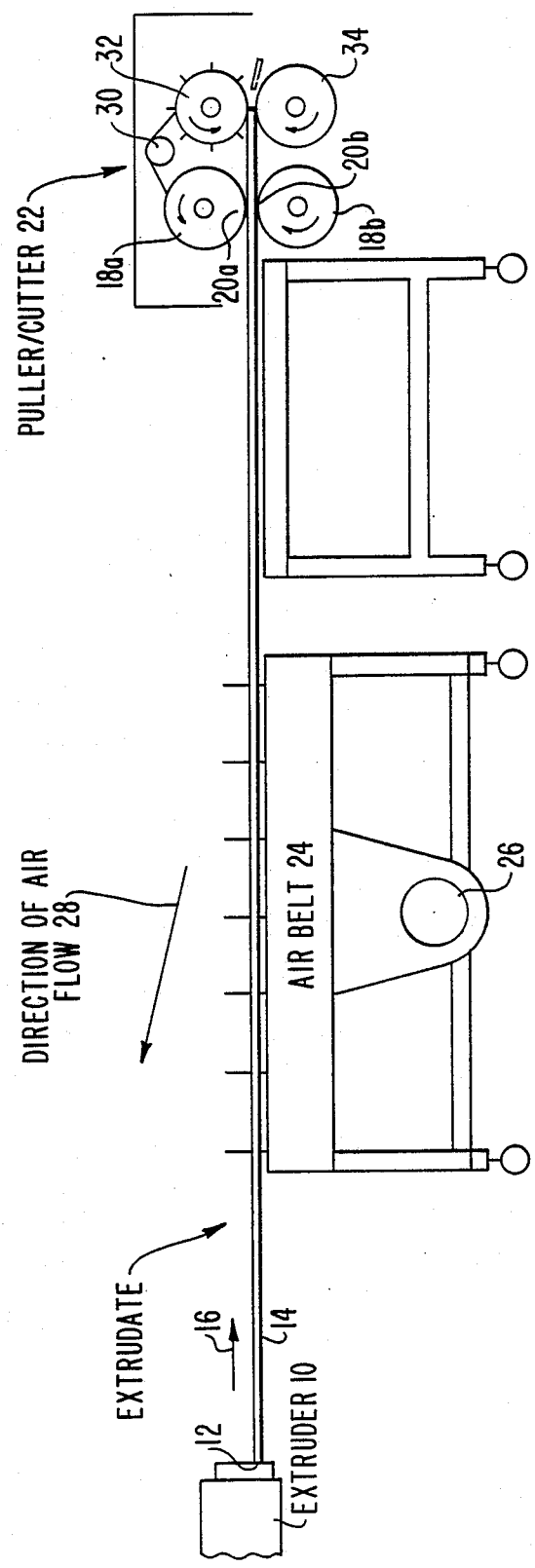
FIG. 1 is a side elevation view, partially schematic, of an apparatus for carrying out the process of the present invention.

In the embodiment shown in FIG. 1, a mass of flowable food material is continuously extruded by extruder 10 through a die orifice 12 to form a continuous, flexible, extrudate ribbon 14 that is moving in the direction of arrow 16. The extrusion rate is generally about 25-44 m/min (about 85-145 feet/min).

In order to provide a high quality, smooth and straight cut when dividing the ribbon into individual food pieces, the extruded flexible ribbon is subjected to a curing regime prior to cutting. By curing the ribbon in accordance with the present invention, the continuous flexible ribbon is partially rigidified to form a semi-rigid ribbon that can be cut with substantially planar cuts and without substantial pinching of the ribbon during cutting.

During curing, the continuous ribbon 14 is fed between a pair of pull rollers 18a and 18b having opposing roller surfaces 20a and 20b that contact ribbon 14. Pull rollers 18a and 18b are part of a puller/cutter assembly 22 that is positioned a sufficient distance from die orifice 12 to allow curing of the ribbon into a semi-rigid condition, e.g., about 3-9 m (about 15-30 feet), preferably about 7 m (about 22 feet).

In a preferred embodiment, the outer surfaces of pull rollers 18a and 18b are deformable, with rubberfaced pull rollers being most preferred.

An air belt 24, such as a Futer TM air belt, is positioned beneath the extruded ribbon 14 between extruder 10 and puller/cutter assembly 22. Air Belt 24 provides a moving stream of air that contacts the continuous ribbon and supports the moving ribbon, thereby removing heat and moisture from the ribbon during curing. Air belt 24 can be any suitable length, e.g., about 1.5-6 m (about 5-20 feet), preferably about 3 m (about 10 feet). Suitable velocities for the moving stream of air provided by the air belt are within the range of about 300-600 m/min (about 1,000-2,000 feet/min). Advantageously, the air belt is provided with an adjustable speed fan drive 26 for varying the air velocity. In the embodiment shown in FIG. 1, air is flowing in the direction of arrow 28 during curing of the extrudate ribbon.

During curing, pull rollers 18a and 18b are complementarily rotated in opposite directions so that the opposing roller surfaces 20a and 20b pull the continuous ribbon 14 at a rate of speed that is faster than the extrusion rate of the ribbon. Stretching the ribbon facilitates the process of curing of the ribbon into semi-rigidity.

Depending on the consistency of the extrudate ribbon, the opposing roller surfaces 20a and 20b generally pull the continuous ribbon at a rate of speed that is less than about 20% faster than the extrusion rate of the ribbon, preferably about 2-10% faster than the extrusion rate of the ribbon. Depending on ribbon extrusion rate, the opposing roller surfaces of the pull rollers generally pull the continuous ribbon at a rate of speed of about 30-45 m/min (about 100-150 feet/min.), preferably about 40 m/min (about 130 feet/min). In a preferred embodiment, rollers 18a and 18b are driven by a single roller drive 30.

Figure 2:
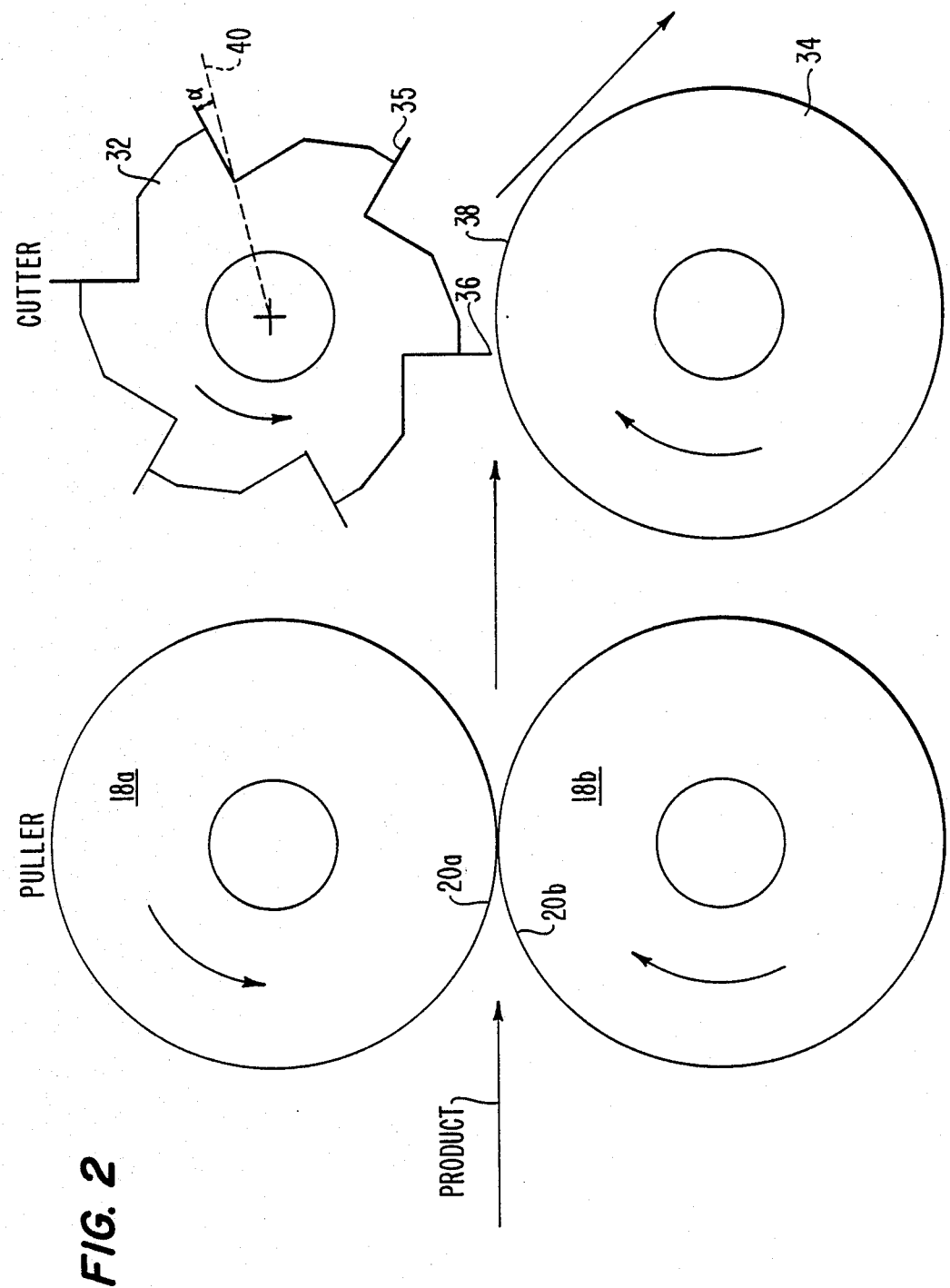
FIG. 2 is an enlarged side elevation view partially schematic, showing details of the puller/cutter assembly shown in FIG. 1.

After curing the ribbon into semi-rigidity, pull rollers 18a and 18b push the semi-rigid ribbon into a downstream cutter device of puller/cutter assembly 22, shown in greater detail in FIG. 2. The cutter includes a cutter roller 32 and an opposing backup roler 34 that preferably is deformable, e.g., rubber faced.

Cutting roller 32 has a plurality of outwardly projecting, transversely mounted blades 35 with edges 36 that bias during cutting against the outer, rubber faced support surface 38 of backup roller 34. In the embodiment shown, six transversely mounted blades 35 are evenly spaced about the periphery of cutter roller 32, with each blade being separated by a distance about equal to the length of the individual food pieces after cutting.

In accordance with the present invention, the blades 35 are positioned at an angle α to form cuts in the ribbon that are substantially perpendicular to the direction of ribbon travel. Depending on the diameter of the cutter roller, and on the properties of the product being cut, blades 35 are angled about 0-20 degrees forward of a radially-extending line 40 of the cutter roller to provide a cut that is perpendicular to flow.

In a particulary preferred embodiment, the blade angle α is at an angle of about 10 degrees forward of a radially extending line 40 of cutter roller 32.

Advantageously, blades 35 are replaceable, and angle α is adjustable to vary the blade angle.

During cutting, the opposing cutter and backup rollers are complementarily rotated in opposite directions, so that the cutter blade edges 36 and the outer surface 38 of the backup roller rotate at substantially the same speed as the opposing roller surfaces 20a and 20b of the pull rollers 18a and 18b, to cut the semi-rigid ribbon and form individual food pieces having substantially planar cut faces. Advantageously, the cutter and backup rollers are driven by the same roller drive 30 as the pull rollers, so that speed-up or slow-down of drive 30 will maintain the speed ratio of the pull rollers and cutter rollers constant, preferably at a speed ratio of 1:1.

By subjecting extrudate ribbons to a conditioning or curing regime prior to cutting, cut quality can be controlled under varying extrusion conditions. Curing of the extrudate ribbon can be easily controlled without undue experimentation by adjusting the distance between the extruder and the cutter and/or by controlling air flow through the air belt, to compensate for day-to-day variations in extrudate moisture, velocity, and the like. This provides a consistently high quality of cut for the extrudate, thereby forming individual food pieces having substantially planar cut faces that are perpendicular to the direction of ribbon travel. Curing of the extrudate ribbon in accordance with the present invention imparts sufficient structural integrity to the extrudate so as to avoid crimping of the extrudate, or possibly only partial cutting of the extrudate due to compaction by a cutter blade. The process provides a reliable cutting system for materials which do not process well using standard pinch or blade cut-off techniques, and provides a clean, perpendicular and planar cut with a very low level of waste.

The invention is further illustrated by the following example, which is not intended to be limiting.

EXAMPLE

A farinaceous mixture containing 40 weight percent potato flakes, 30 weight percent white corn meal and 30 weight percent rice flour was mixed with water to a total moisture content of about 15-25 weight percent to form a mass of flowable food material. The mix was introduced into a cooking extruder and extruded at about 70-75 kg/hr (about 150-165 lbs/hr).

The extrudate ribbon was passed over a Futer TM air belt that had been shortened from 20 to 10 feet, and which produced an upwardly oriented air velocity within the range of about 300-600 m/min (about 1,000 to 2,000 feet/min. The extrudate ribbon was then fed into a puller/cutter assembly in accordance with the invention, located about 7 m (about 22 feet) from the extruder. The extrudate ribbon passed through a pair of pull rollers that pulled the ribbon at about 40 m/min (about 130 feet/min), and was fed between a backup roller and a six blade, 14.7 cm (5.58 inch) diameter rotary cutter turning at 89 rpm. The cutter blades were angled about 10 degrees forward of a radially-extending line of the cutter roller. The ribbon was cut into 2½ inch long individual food pieces having a ¼ inch by ¼ inch cross section, with planar cuts that were substantially perpendicular to the direction of ribbon travel.

Since many modifications, variations and changes in detail may be made at the described embodiment, it is intended that all matter in the foregoing description and shown in the accompanying drawings be interpreted as illustrative and not in a limiting sense.

We claim:

1. A process for forming individual food pieces from a mass flowable food material, comprising:
   (a) continuously extruding a flowable food material through a die orifice at a first rate of speed, to form a moving, continuous, flexible, extrudate ribbon;
   (b) curing the continuous flexible ribbon to form a continuous semi-rigid ribbon that can be cut with substantially planar cuts and without substantial pinching of the ribbon during cutting, wherein said curing includes the steps of:
      (i) feeding the continuous ribbon between a pair of pull rollers having opposing roller surfaces that contact the ribbon; and
      (ii) rotating the pull rollers in opposite directions so that the opposing roller surfaces pull the continuous ribbon at a rate of speed that is faster than the extrusion rate of the ribbon to thereby stretch the ribbon during formation of said semi-rigid ribbon, which semi-rigid ribbon is then pushed by the pull rollers into a cutter having a cutter roller and an opposing backup roller, the cutter roller having outwardly projecting transversly mounted blades with edges that bias against an outer support surface of the backup roller during cutting, the blades being positioned to form cuts in the ribbon that are substantially prependicular to the direction of ribbon travel;
   (c) rotating the opposing cutter and backup rollers in opposite directions so that the cutter blade edges and the outer support surface of the backup roller rotate at substantially the same speed as the opposing roller surfaces of the pull rollers, to cut the semi-rigid ribbon with cuts that are substantially perpendicular to the direction of ribbon travel, and thereby form individual food pieces having substantially planar cut faces.

2. The process of claim 1 wherein the curing step includes contacting the continuous ribbon with a moving stream of air prior to feeding the ribbon between the pull rollers, to remove heat and moisture from the ribbon.

3. The process of claim 2 wherein the moving stream of air is provided by an air belt that supports the moving ribbon between the die orifice and the pull rollers.

4. The process of claim 3 wherein the moving stream of air has a velocity within the range of about 300–600 m/min (about 1,000–2,000 feet/min).

5. The process of claim 1 wherein said blades are angled about 0–20 degrees forward of a radially-extending line of the cutter roller.

6. The process of claim 5 wherein said blades are angled about 10 degrees forward of a radially-extending line of the cutter roller.

7. The process of claim 1 wherein the pull rollers are rotated so that the opposing roller surfaces pull the continuous ribbon at a rate of speed that is less than about 20% faster than the extrusion rate of the ribbon.

8. The process of claim 7 wherein the pull rollers are rotated so that the opposing roller surfaces pull the continuous ribbon at a rate of speed that is about 2–10% faster than the extrusion rate of the ribbon.

9. The process of claim 8 wherein the pull rollers are rotated so that the opposing roller surfaces pull the continuous ribbon at a rate of speed of about 30–45 m/min (about 100–150 feet/min).

10. The process of claim 1 wherein the pull rollers in conjunction with the cutter and backup rollers are rotated by the same drive.

11. The process of claim 1 further including the step of positioning the cutter assembly about 3–9 m (about 10–30 feet) from the die orifice.

12. The process of claim 11 wherein the cutter assembly is positioned about 7 m (about 22 feet) from the die orifice.

13. The process of claim 7 further including the step of adjusting the rotational speeds of the pull rollers and opposing cutter and backup rollers.

14. Apparatus for forming individual food pieces from a mass of flowable food material, comprising:
   (a) means for continuously extruding a flowable food material through a die orifice at a first rate of speed, to form a moving, continuous, flexible extrudate ribbon;
   (b) means for curing the continuous flexible ribbon to form a continuous semi-rigid ribbon that can be cut with substantially planar cuts and without substantial pinching of the ribbon during cutting, the curing means including:
      (i) a pair of pull rollers into which the continuous ribbon is fed, the pull rollers having opposing roller surfaces that contact the ribbon;
      (ii) means for rotating the pull rollers in opposite directions so that the opposing roller surfaces pull the continuous ribbon at a rate of speed that is faster than the extrusion rate of the ribbon to therby stretch the ribbon during formation of said semi-rigid ribbon;
   (c) a cutter positioned to receive said semi-rigid ribbon from said pull rollers, the cutter having a cutter roller and an opposing backup roller, the cutter roller having outwardly projecting transversely mounted blades with edges that bias aginst an outer support surface of the backup roller during cutting, the blades being positioned to form cuts in the ribbon that are substantially perpendicular to the direction of ribbon travel;
   (d) means for rotating the opposing cutter and backup rollers so that the cutter blade edges and the outer support surface of the backup roller rotate at substantially the same speed as the opposing roller surfaces of the pull rollers, to cut the semi-rigid ribbon with cuts that are substantially prependicular to the direction of ribbon travel and thereby form individual food pieces having substantially planar cut faces.

15. The apparatus of claim 14 wherein the curing means includes means for contacting the continuous ribbon with a moving stream of air prior to feeding the ribbon to the pull rollers, to removeheat and moisture from the ribbon.

16. The apparatus of claim 15 wherein the means for contacting the continuous ribbon with a moving stream of air is comprised of an air belt that supports the moving ribbon between the die orifice and the pull rollers.

17. The apparatus of claim 15 wherein the means for contacting the continuous ribbon with a moving stream of air is comprised of an air belt that supports the moving ribbon between the die orifice and the pull roller with a moving stream of air having a velocity within the range of about 300–600 m/min (about 1,000–2,000 feet/min).

18. The apparatus of claim 17 including means for adjusting the air velocity of the air belt.

19. The apparatus of claim 14 including means for mounting said blades at an angle of about 0–20 degrees forward of a radially-extending line of the cutter roller.

20. The apparatus of claim 14 including means for mounting said blades at an angle of about 10 degrees forward of a radially-extending line of the cutter roller.

21. The apparatus of claim 14 wherein the pull roller rotating means is comprised of means for rotating the pull rollers so that the opposing roller surfaces pull the continuous ribbon at a rate of speed that is less than about 20% faster than the extrusion rate of the ribbon.

22. The apparatus of claim 14 wherein the pull roller rotating means is comprised of means for rotating the opposing roller surfaces so as to pull the continuous ribbon at a rate of speed that is about 2–10 percent faster than said first rate of speed.

23. The apparatus of claim 14 wherein the pull roller rotating means is comprised of means for rotating the opposing roller surfaces so as to pull the continuous ribbon at a rate of speed of about 30–45 m/min (about 100–150 feet/min).

24. The apparatus of claim 14 wherein the pull roller rotating means and the cutter and backup roller rotating means comprise the same rotating means.

25. The apparatus of claim 14 including means for positioning the cuter assembly about 3–9 m (about 10–30 feet) from the die orifice.

26. The apparatus of claim 14 including means for positioning the cutter assembly about 7 m (about 22 feet) from the die orifice.

27. The apparatus of claim 14 wherein the means for rotating the pull rollers and for rotating the opposing cutter and backup rollers is an adjustable speed rotating means.

* * * * *